United States Patent
Kindaichi

(10) Patent No.: US 6,535,246 B2
(45) Date of Patent: Mar. 18, 2003

(54) CAMERA WITH DIGITAL IMAGE PICKUP ELEMENT

(75) Inventor: Takeshi Kindaichi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/953,732

(22) Filed: Sep. 17, 2001

(65) Prior Publication Data

US 2002/0033881 A1 Mar. 21, 2002

(30) Foreign Application Priority Data

Sep. 20, 2000 (JP) .................................. 2000-285629

(51) Int. Cl.⁷ .............. H04N 5/76; H04N 7/18; H04N 9/47; G03B 29/00
(52) U.S. Cl. .............. 348/231.99; 348/231.9; 348/64; 396/429
(58) Field of Search ................ 348/64, 231, 232, 348/233; 396/429

(56) References Cited

U.S. PATENT DOCUMENTS 5,619,257 A * 4/1997 Reele et al. ............... 348/64
5,950,031 A * 9/1999 Yamagata ................... 396/429

FOREIGN PATENT DOCUMENTS

JP  5-40889 A  2/1993

* cited by examiner

Primary Examiner—Andrew Christensen
Assistant Examiner—Tia M. Harris
(74) Attorney, Agent, or Firm—Frishauf, Holtz, Goodman & Chick, P.C.

(57) ABSTRACT

A camera is provided which includes an exposure mechanism adapted to expose an image of an object onto film, and an image pickup element adapted to capture a digital image of the object. A memory stores digital image data captured by the image pickup element, and a mode setting switch enables setting of either a digital photographic mode which executes only operations to capture digital images, or a hybrid photographic mode which executes both operations to capture digital images and operations to expose object images onto the film. A CPU controls use of the memory so that in the digital photographic mode, old digital image data stored in the memory is overwritten with new digital image data when there is insufficient free space in the memory.

6 Claims, 3 Drawing Sheets

CAMERA WITH DIGITAL IMAGE PICKUP ELEMENT

This application claims the benefit of Japanese Application No. 2000-285629 filed in Japan on Sep. 20, 2000, the contents of which are incorporated herein by reference.

BACKGROUND OF THE INVENTION

1. Field of the Invention

The present invention relates to a camera with a digital image pickup element that uses image pickup elements such as CCD and CMOS imagers, and more particularly to a method for storing captured digital image data.

2. Description of the Related Art

Because there is a limit to the capacity of a storage element for storing image data in cameras with digital image pickup elements, the following storage methods have been used.

Firstly, a digital image data storage method is known that relates to digital still cameras. In this storage method, digital image data is sequentially stored in free memory areas. Photographic operations are disabled when there is no more , space left in memory.

Another known digital image data storing method relates to surveillance cameras. In this storage method, digital image data of monitored images is sequentially recorded in memory. When there is no more free space in memory, image data is saved by overwriting in the area in which old digital image data is recorded.

SUMMARY OF THE INVENTION

Simply put, the camera of the present invention comprises: an exposure means for exposing an object image onto film; image pickup means for capturing the above object using an image pickup element; a storage means for storing the digital image data captured using the above image pickup means; a mode setting means that enables setting of a digital photographic mode, which executes only image pickup operations for digital images, or a hybrid photographic mode that executes both image pickup operations for digital images and operations to expose images onto film; and a control means that controls the operations of the above storage means.

When there is insufficient free storage capacity in the above storage means, the control means controls the storage means so that new digital image data overwrites old digital image data that has been stored in the storage means in the above digital photographic mode.

The objects and advantages of the present invention will become further apparent from the following detailed explanation.

DETAILED DESCRIPTION OF THE PREFERRED EMBODIMENTS

Aspects of the embodiment of the present invention will be explained below with reference to the figures.

A hybrid style camera (hereinafter referred to as a hybrid camera) is assumed as one aspect of the embodiment of a camera equipped with a digital image pickup element according to the present invention. This hybrid camera has a film photographic mechanism that exposes the image of an object onto ordinary film and a digital photographic mechanism that captures digital images with an image pickup element such as a CCD or CMOS imager.

There are three photographic modes in this hybrid camera. That is, there is a first mode (film photographic mode) that uses the above film photographic mechanism to implement only operations that expose an object to ordinary film, a second mode (digital photographic mode) that uses the above digital pickup mechanism to capture digital images, and a third mode (hybrid photographic mode) that uses both of the above mechanisms to expose the object onto film and at the same time capture the object as a digital image.

Figure 1:
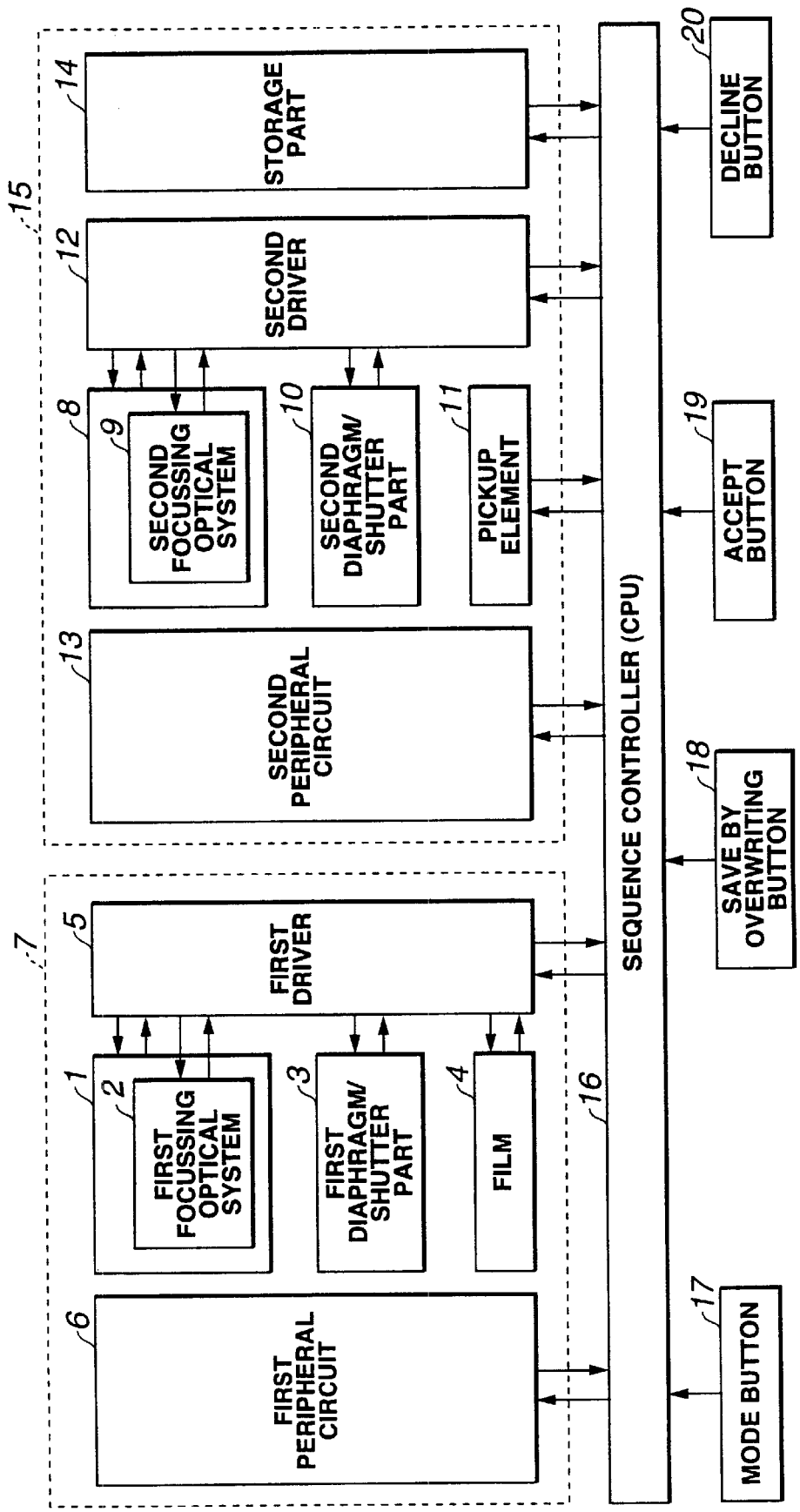
FIG. 1 is a block diagram showing a first aspect of the embodiment of a camera equipped with the digital image pickup element of the present invention and showing an overview of the configuration of this camera.

FIG. 1 is a block diagram showing the basic configuration of a hybrid camera that is a first aspect of the embodiment of a camera equipped with a digital image pickup element according to the present invention.

As shown in FIG. 1, the hybrid camera of this aspect of the embodiment is configured using: a photographic means 7 for recording the image of an object onto a film 4; a digital image pickup means 15 for incorporating and storing image data relating to an object using an image pickup element 11 such as a CCD or CMOS imager; a sequence controller 16 (hereinafter referred to as a CPU) that enables system control for the whole camera; and operation means operated by the user including a mode button 17; a save-by-overwriting button 18; an accept button 19; and a decline button 20.

The above image pickup means 7 is configured to include a first variable power optical system 1, a first diaphragm/shutter part 3, a first driver 5, and a first peripheral circuit part 6, and is of a configuration that enables a film 4 to be loaded into it.

In image pickup means 7, the above first variable power optical system 1 is an optical means for guiding light from an object onto the film 4. It also has a variable power function that can change the angle of field in this optical means. This first variable power optical system 1 is also equipped with a first focussing optical system 2. This first focussing optical system 2 has a function.for imaging light from an object onto film 4.

A first diaphragm/shutter 3 controls exposure onto the film 4 and is equipped with a diaphragm adjustment mechanism and shutter drive mechanism, not shown.

A first driver 5 is a drive means that drives and controls the above first variable power optical system 1, the above first focusing optical system 2, the first diaphragm/shutter 3, and the winding on and winding back of the above film 4.

A first peripheral circuit 6 is configured to include circuit members and members with functions not directly related to the explanation of the present invention. These include a range finding means, a photometry means, and an illumination means such as a light-emitting strobe.

The above first driver 5 and the above first peripheral circuit 6 are each connected to the CPU 16 and provide operational control required in image capture using this CPU 16.

The above digital image pickup means 15 is configured to include a second variable power optical system 8, a second diaphragm/shutter part 10, an image pickup element 11, a second driver 12, a second peripheral circuit 13, and a storage unit 14.

In the digital image pickup means 15, the above image pickup element 11 is configured using a CCD or CMOS imager. The light from the object (object light) incorporated by using the above second variable power optical system 8 is imaged in this image pickup element.

The second variable power optical system 8 is an optical means for guiding light from an object to the above image pickup element 11. In addition, it has a variable power function that can vary the angle of field in the above optical system means. A second focussing optical system 9 is provided in this second variable power optical system 8. This second focussing optical system 9 has a function that images the light from an object onto the image pickup element 11.

The second diaphragm/shutter part 10 controls exposure in the image pickup element 11 and includes a diaphragm adjustment mechanism and sensor controller drive mechanism, not shown.

The second driver 12 is a drive means that drives and controls the above second variable power optical system 8, the above second focussing optical system 9, and the second diaphragm/shutter part 10.

The second peripheral circuit 13 is equipped with circuit members and members with functions that are not directly related to the explanation of the present invention. For example, it includes a display means for displaying captured digital images.

A storage unit 14 is a storage means for recording captured digital image data. It is configured, for example, to include small hard disks and flash memory. Sometimes storage media, such as memory cards, can be installed therein. In this case, image data incorporated from the image pickup element 11 is stored on the installed memory card or can be read from that card.

The above image pickup element 11, the above second driver 12, the above second peripheral circuit 13, and the above storage unit 14 are each connected to the CPU 16 and are implemented such that operational control required for capturing images are made by using this CPU 16.

That is, the CPU 16 can control the system for the whole camera. It controls everything associated with the above image pickup means 7 and the above digital image pickup means 15. Furthermore, it acquires digital image data from the image pickup element 11 and performs image processing calculations.

Also, operating means including the above mode button 17, save-by-overwriting button 18, accept button 19, and decline button 20 are connected to the CPU 16. When, of these buttons, the mode button 17 is pressed, this CPU 16 enables processing control, such as changing or setting the photographic mode of the hybrid camera, based on the operation signal from this mode button 17.

The following photographic modes can be executed in a hybrid camera of the above configuration in this aspect of the embodiment.

That is, the hybrid camera shown in FIG. 1 is equipped with at least three photographic modes: a first mode (film photographic mode) that captures images onto only film 4 using only image pickup means 7; a second mode (digital photographic mode) that captures images onto only the image pickup element 11 using only the digital photographic means 15; and a third mode (hybrid photographic mode) that drives both the image pickup means 7 and digital image pickup means 15 and captures the image simultaneously onto both film 4 and the image pickup element 11. Based on an operation signal issued by the above mode button, the CPU 16 loaded in the camera switches selectively to one of the three photographic modes and executes that mode.

In this aspect of the embodiment, operating means, that is, the overwriting storage button 18, accept button 19, and decline button 20, required in executing storage operations for digital image data, are all connected to the CPU 16.

This overwrite button 18 is a switch for switching between allowing and disabling the overwriting of digital image data and is operated when the user presses it.

The above accept button 19 and decline button 20 are switches that are used to enter decisions made by a user when that user (photographer) decides whether to accept or decline the next operation after a warning and the next operation are displayed before digital image data is stored in the storage unit 14.

Accordingly, when the overwrite button 18 is pressed, the CPU 16 controls switching between accept and decline operations for saving digital image data by overwriting in the storage unit 14 based on operation signals from this overwrite button 18. Also, based on the operation signal that accompanies the pressing of either the above accept button 19 or decline button 20, the CPU 16 controls whether or not the next operation will be executed when a warning and the next operation are displayed before storage of digital data into a storage unit 14.

Next, details of the control and operation of the hybrid camera of this aspect of the embodiment will be explained in detail while referring to FIG. 2.

Figure 2:
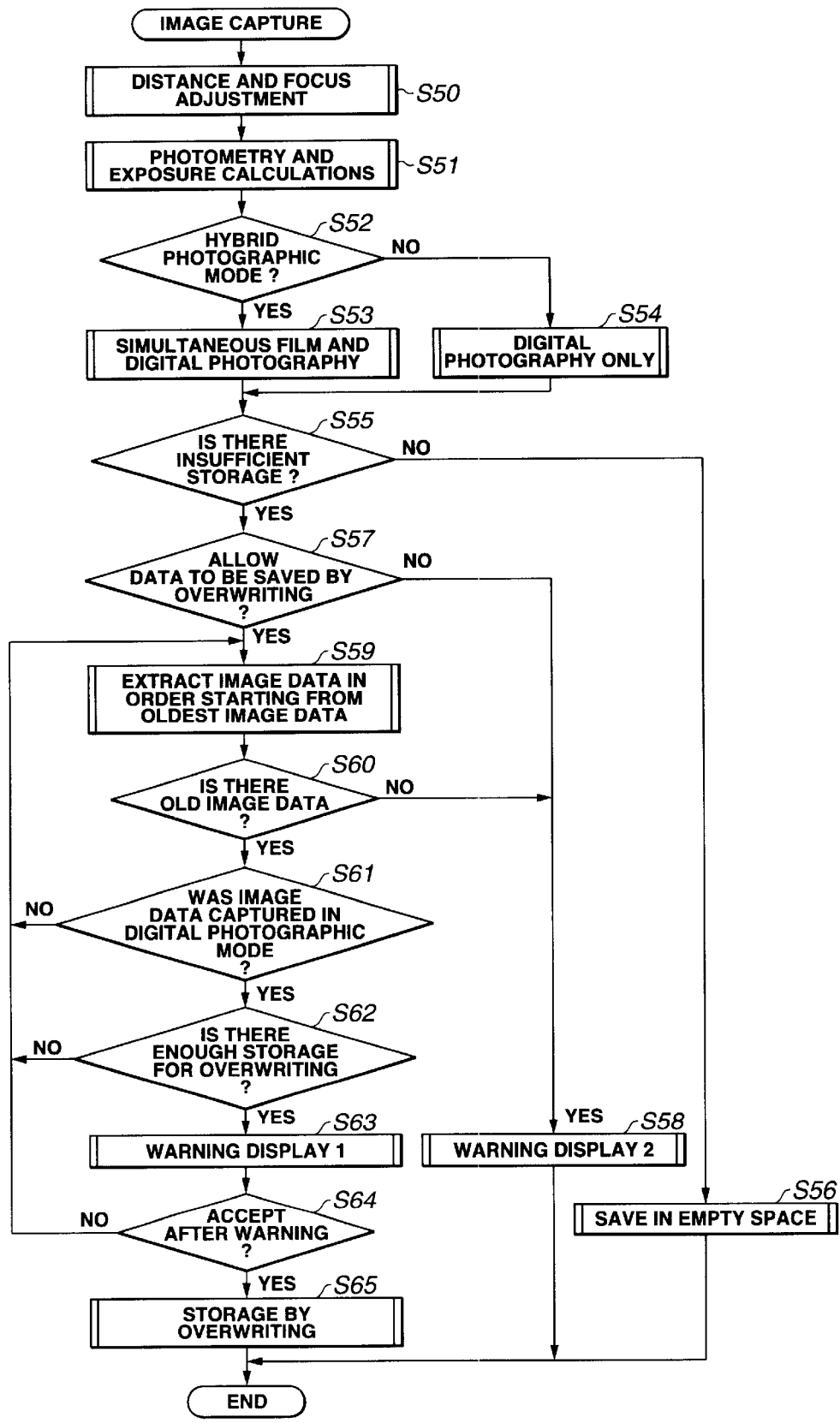
FIG. 2 is a flow chart that shows an example of a pickup sequence in the first aspect of the embodiment.

FIG. 2 is a flow chart that shows an example of an image pickup sequence in the CPU 16 of FIG. 1 for this aspect of the embodiment. In an example of the control and operation of this aspect of the embodiment, the aforementioned first photographic mode (film photographic mode) does not take digital images and so it is excluded from any explanation of control and operations relating to this pickup sequence. Note however, that this film photographic mode is not limited by the aforementioned "capture images onto only film". It can also capture digital images and display them using the second peripheral circuit 13. Of course, it does not store digital data.

It shall be assumed that the power source (not shown) for the hybrid camera shown in FIG. 1 is on or that power is turned on by the insertion of batteries. When the power is on, the CPU 16 is activated, a main routine, not shown, is executed, and this hybrid camera awaits photography.

During this wait status, let us assume that the user presses the release switch, not shown, on this hybrid camera. When the user presses this switch, the CPU 16 executes the image pickup sequence in the main routine, that is, it activates the image pickup sequence shown in FIG. 2.

Using the processing of step S50, the CPU 1 firstly finds the range of a main object using the first peripheral circuit 6 (range finding means). It then implements control so that the pickup optical system is focused using the first and second focusing optical systems 2 and 9, and the first and second drivers 5 and 12. When this photometry and focusing is complete, the CPU moves processing to the next step S51.

In the processing of step S51, the CPU 16 implements photometry of the field using the first peripheral circuit 6 (photometry means) and exerts control so that exposure calculations are processed based on the results of photometry. When exposure calculation processing has finished, the CPU 16 moves processing to the decision processing of step S52 in which the photographic mode used is judged. In other words, in the decision processing using step S52, the CPU 16 determines whether or not the already selected photographic mode is the hybrid mode. If it determines that the photographic mode is the hybrid mode, it moves processing to step S53. If it determines that the photographic mode is not the hybrid mode, but digital photographic mode, it moves processing to step S54.

In this aspect of the embodiment, the photographic mode is determined based on the decision processing of aforementioned step S52. Control is implemented so that processing based on the determined photographic mode is performed. In this aspect of the embodiment, film photographic mode is excluded as discussed above.

For example, when hybrid mode has been determined as the photographic mode in the decision processing of above step S52, the CPU 1 implements control so that an image is captured simultaneously both by film 4 and by the image pickup element 11 in the processing of step S53. Processing then continues on to step S55.

On the other hand, if in the decision processing of aforementioned step S52, the photographic mode selected is not hybrid mode but digital photographic mode, the CPU 16 executes processing based on the digital photographic mode. In other words, it moves processing to step S54. In this processing, the CPU 16 controls processing to ensure that images are captured only using the image pickup element 11. Processing then moves to step S55.

In the decision processing of step S55, the CPU 16 then compares the size of captured digital image data and the size of the free space in the storage unit 14 to determine whether or not there is sufficient free space in storage unit 14. If, as a result, it is determined that there is sufficient free space in storage unit 14, processing will move to step S56. In this processing, captured digital image data is recorded in the free space. When recording is completed, this image pickup routine ends and processing is returned to the main routine. On the other hand, if it is determined that there is insufficient storage, processing will move to the decision processing of step S57.

In the decision processing of step S57, there is insufficient storage in storage unit 14 and so the CPU 16 determines whether or not save-by-overwriting is accepted or declined. Specifically, it makes the decision based on the accept/decline setting for save-by-overwriting made when the user presses the above overwriting button 18. The save-by-overwriting accept or decline setting is made by the user (photographer) using the above save-by-overwriting button 18 before the start of the image pickup sequence. Alternatively, when the captured digital image has been captured in digital photographic mode, it is possible that overwriting will be disabled. In other words, only when there is film 4 remaining, there is no storage space remaining in storage unit 14, and the photographic mode is hybrid photographic mode, it is possible that save-by-overwriting will be allowed.

Accordingly, in light of this status, when it is determined that save-by-overwriting is disabled in the decision processing of the above step S57, the CPU 16 moves processing to step S58. Then, control is implemented so that the fact that captured digital image data cannot be saved is displayed in a warning on the display means (not shown) in, for example, the second peripheral circuit 13. In this aspect of the embodiment, the processing content in this step S58 is not limited to this but can include various variations. For example, after a display warning that digital image data cannot be saved, processing can be controlled to create timing for erasure of unnecessary digital image data and recording of new data in the area from which old data was erased.

On the other hand, when save-by-overwriting is allowed in the decision processing of above step S57, the CPU 16 moves processing to step S59 and extracts digital image data from the storage unit 14, in order, starting with the oldest captured data. At this time, the CPU 16 acquires and recognises the start address of extracted digital image data in the storage unit 14 and information regarding storage capacity.

When extracting old digital image data in the decision processing of the following step S60, the CPU 16 then determines whether or not there is any old image data that could be overwritten. If the CPU 16 decides that there is no old image data that can be overwritten, it moves processing to the next step S58 and controls processing so that, as above, the fact that digital image data cannot be stored is displayed as a warning in the display means (not shown) in, for example, the second peripheral circuit 13. On the other hand, when there is digital image data that can be overwritten and that has been able to be extracted, the CPU 16 moves processing to the following step S61.

In the decision processing of step S61, the CPU 16 determines whether or not the extracted image data was captured in digital photographic mode. If it determines that the digital image data was captured not in digital photographic mode but in hybrid photographic mode, it disables overwriting and returns processing to that of aforementioned step S59, where the next oldest digital image data will be extracted. Here, the reason for disabling overwriting of digital image data captured in hybrid photographic mode is to prevent any problems in hybrid photographic mode that may be caused by the erasure of digital image data corresponding to images captured on film 4.

On the other hand, if the CPU 16 determines that the digital image data was captured in digital photographic mode in the decision processing of the above step S61, it moves processing to the following step S62.

In the decision processing of the aforementioned step S62, the CPU 16 compares the size of the extracted digital image data and the size of the digital image data that is to overwrite it. If it deems that there is insufficient space in storage unit 14 for save-by-overwriting, the CPU 16 will return processing to aforementioned step S59 and extract the next oldest image data. In many cases, digital image data will generally have undergone JPEG compression. JPEG compression causes variation in data sizes after compression. Therefore, the size of the data to be stored may be greater than the size of the data to be overwritten. Also, when digital image data is to be stored, its storage may be managed in a dispersed manner within the storage unit 14. In this case the decision processing of the aforementioned step S62 need not be executed.

On the other hand, if the decision processing of the aforementioned step S62 deems that there is sufficient storage for save-by-overwriting and that such a save operation is possible, the CPU 16 displays as a warning the fact that overwriting will occur in the processing of the next step S63 on the display means (not shown) in, for example, the second peripheral circuit 13. At this time, in the warning display processing of step S63, processing can be controlled to ensure display of the digital image data to be overwritten. There are variations in the display method to be used here and processing can be controlled to display the warning so that it overlaps the captured image on a mini-screen.

The CPU 16 then moves processing to the decision processing of step S64. This decision processing determines whether or not the user has accepted save-by-overwriting processing after the warning display of aforementioned step S63. Specifically, as explained above, the CPU 16 determines the wishes of the user (photographer) based on the pressing of the accept button 19 or decline button 20. When, as a result of this processing, the CPU 16 determines that the user (photographer) has not accepted save-by-overwriting because the decline button 20 has been pressed, it will return processing back to step S59 and the next oldest digital image data will be extracted. Conversely, when the CPU determines that the user has accepted save-by-overwriting because the accept button 19 has been pressed, it controls processing so that in the processing of the next step S65, the extracted image data will be overwritten by the captured digital image data. When the overwrite operation is completed, this image pickup routine will end and the main routine will be reinstated.

Thus, in this aspect of the embodiment, because overwriting is allowed for digital image data captured in digital mode as described above, even when there is no free space in storage unit 14 and there is unused film 4, images can be accurately captured in hybrid photographic mode. Also, because the decision relating to overwriting is made using the wishes of the user, that is using buttons (accept button 19, decline button 20), the camera can be operated easily and its user-friendliness is improved. Accordingly, in hybrid cameras, the size of the expensive storage unit 14 can be minimised enabling the provision of a hybrid camera that is cheaper but that has improved performance and is easier to operate.

Next, a second aspect of the embodiment of the present invention will be explained.

Figure 3:
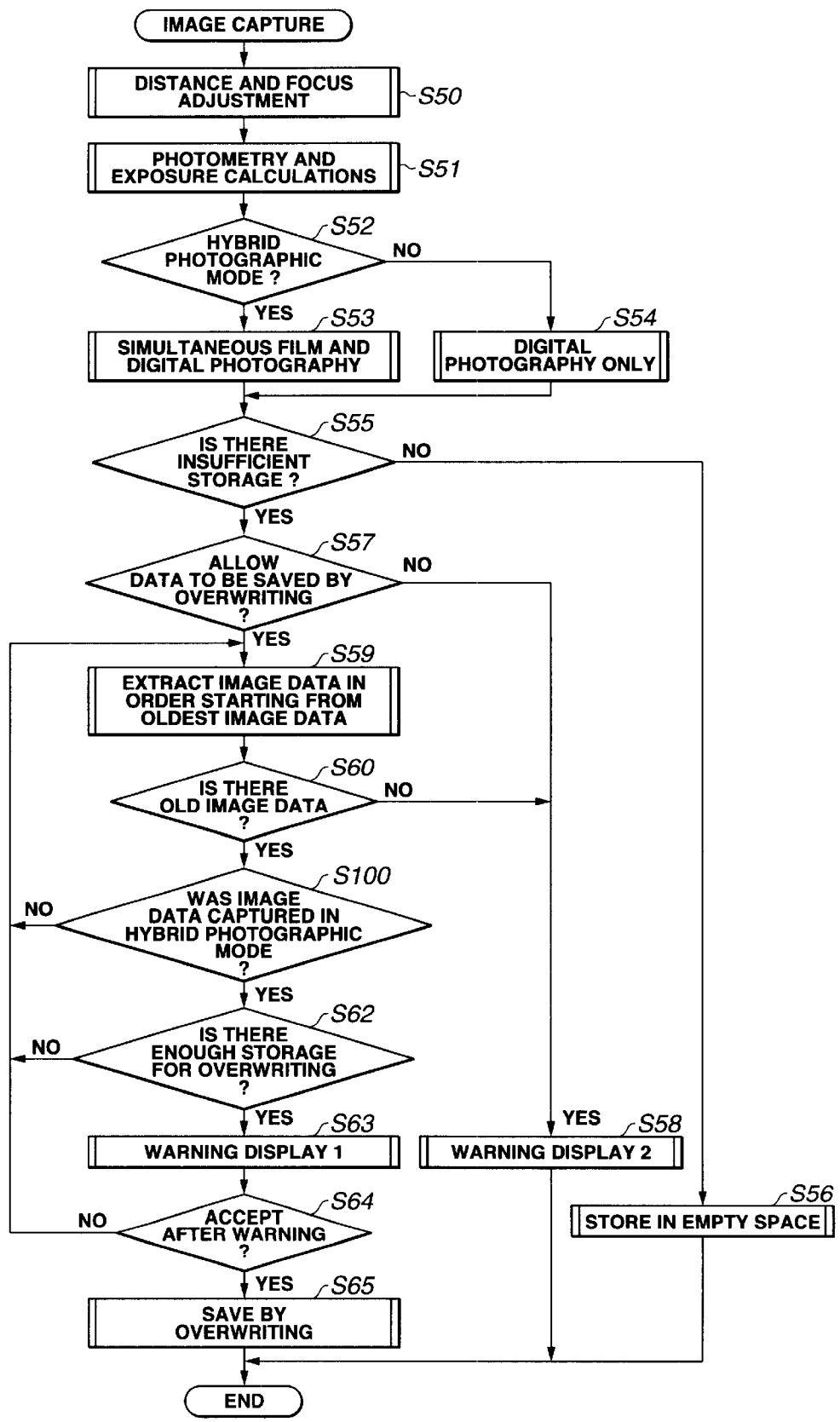
FIG. 3 is a flow chart that shows a second aspect of the embodiment of a camera equipped with a digital image pickup element according to the present invention, and shows an example of a pickup sequence in this camera.

FIG. 3 is a flowchart showing an example of an image pickup routine in a hybrid camera of a second aspect of the embodiment of the present invention. Processing that is the same as that shown in the flowchart of FIG. 2 for the hybrid camera of the above first aspect of the embodiment is given the same step number in FIG. 3.

The configuration of the hybrid camera of this second aspect of the embodiment is substantially the same as that of the hybrid camera in the above first aspect of the embodiment. In other words, the configuration is substantially the same as that shown in FIG. 1. The difference is in the improved pickup sequence processing in the CPU 16. Accordingly, detailed explanation of the configuration of the hybrid camera in this second aspect of the embodiment will be omitted because it is substantially the same as for the above first aspect of the embodiment.

Next, details of the control operations for the hybrid camera of this second aspect of the embodiment will be explained with reference to FIG. 3.

While the control operations for the hybrid camera of this second aspect of the embodiment are substantially the same as in the capture sequence processing of FIG. 2 for the hybrid camera of the above first aspect of the embodiment as explained above, the differences are in the alteration of step S61 in the image pickup sequence processing of FIG. 2 and in the provision of step S100. Accordingly, detailed explanation of those parts with the same step numbers as in FIG. 2 for the hybrid camera of the above first aspect of the embodiment will be omitted and explanations will be given only for parts that are different.

In the pickup routine processing shown in FIG. 3, the CPU 16, as explained in the first aspect of the embodiment explained above, in the decision processing of step S60, determines whether or not there is any old image data that could be overwritten when old digital image data is extracted. If it determines that there is no old image data that can be overwritten, the CPU 16 moves processing to step S58 and, as in the above first aspect of the embodiment, controls processing so that the fact that digital image data cannot be stored is displayed as a warning on the display means (not pictured) in the second peripheral circuit 13. On the other hand, if it is able to extract digital image data that can be overwritten, in this aspect of the embodiment, the CPU 16 moves processing to the decision processing of step S100.

In the decision processing of step S100, the CPU 16 determines whether or not the image data that it has been able to extract was captured in hybrid mode. If it determines that the digital image data was captured not in hybrid mode but in digital photographic mode, it will inhibit overwriting and return processing to above step S59 to extract the next oldest digital image data. On the other hand, if it determines that the digital image data was captured in hybrid mode, the CPU 16 will move processing to the next step S62. All consequent processing is as for the above first aspect of the embodiment (refer to FIG. 2).

That is, in this aspect of the embodiment, processing is the reverse of that of the above first aspect of the embodiment in that overwriting of digital image data captured in digital photographic mode is inhibited but overwriting of digital image data captured in hybrid mode is enabled. Here, it is conceivable that the execution status of the hybrid photographic mode will be affected. However, the image remains on film 4 and so the effectiveness of this mode is exhibited when many images are captured. In other words, a greater number of images can be taken with a smaller storage capacity.

As described above, in this second aspect of the embodiment, unlike in the first aspect of the embodiment, digital image data captured in digital photographic mode cannot be overwritten but digital image data captured in hybrid photographic mode can be overwritten. Therefore, more images can be captured with less storage, thus enabling the camera to be provided at a lesser cost but with improved performance. Other effects are the same as the above first aspect of the embodiment.

The present invention is not limited to the above first and second aspects of the embodiment but includes all applications of these aspects of the embodiment.

As explained above, the above aspects of the embodiment of the present invention enable the smooth capture of images in hybrid mode even when there are restrictions on the size of memory. As well as holding down rising camera costs, the present invention provides a hybrid camera that is easy to use and has improved mechanical performance.

In addition to the so-called hybrid camera, the present invention can be applied in cameras equipped only with a digital image pickup element. For example, in cameras with a digital image pickup element that can be set to ordinary photographic mode and demonstration mode, overwriting can be enabled in demonstration mode. Also, in cameras with a digital image pickup element that can be set to high resolution mode or low resolution mode, overwriting can be enabled in low resolution mode.

In view of the foregoing, it should be apparent that a wide range of different working modes can be formed on the basis of this invention without departing from the spirit and scope of the invention. And this invention is not restricted to any specific embodiment except as limited by the appended claims.

What is claimed is:

1. A camera comprising:

exposure means for exposing an image of an object onto film;

image pickup means for capturing a digital image of the object using an image pickup element;

storage means for storing digital image data captured by said image pickup means;

mode setting means for setting one of: (i) a first mode in which only said image pickup means is operable, and (ii) a second mode in which both said image pickup means and said exposure means are operable;

determination means for determining an amount of free space in said storage means; and control means for controlling use of said storage means so as to either allow or inhibit overwriting of old digital image data by new digital image data according to the mode set by said mode setting means and the amount of free space determined by said determination means;

wherein said control means allows said-overwriting when said first mode is set and inhibits said overwriting when said second mode is set.

2. A camera comprising:

exposure means for exposing an image of an object onto film;

image pickup means for capturing a digital image of the object using an image pickup element;

storage means for storing digital image data captured by said image pickup means;

mode setting means for setting one of: (i) a first mode in which only said image pickup means is operable, and (ii) a second mode in which both said image pickup means and said exposure means are operable;

determination means for determining an amount of free space in said storage means; and control means for controlling use of said storage means so as to either allow or inhibit overwriting of old digital image data by new digital image data according to the mode set by said mode setting means and the amount of free space determined by said determination means;

wherein said control means allows said overwriting when said second mode is set and inhibits said overwriting when said first mode is set.

3. The camera according to claim 1, wherein said control means allows only overwriting of digital image data captured in said first mode.

4. The camera according to claim 1, wherein said control means allows only overwriting of digital image data captured in said second mode.

5. The camera according to claim 2, wherein said control means allows only overwriting of digital image data captured in said first mode.

6. The camera according to claim 2, wherein said control means allows only overwriting of digital image data captured in said second mode.

* * * * *